J. H. CARY.
TOOTHED DRUM OR CYLINDER.
APPLICATION FILED JULY 25, 1916.

1,220,953.

Patented Mar. 27, 1917.

Inventor
James H. Cary.
By T. Walter Fowler
Attorney

UNITED STATES PATENT OFFICE.

JAMES H. CARY, OF MEMPHIS, TENNESSEE.

TOOTHED DRUM OR CYLINDER.

1,220,953.   Specification of Letters Patent.   Patented Mar. 27, 1917.

Application filed July 25, 1916. Serial No. 111,181.

*To all whom it may concern:*

Be it known that I, JAMES H. CARY, a citizen of the United States, residing at Memphis, in the county of Shelby and State of Tennessee, have invented certain new and useful Improvements in Toothed Drums or Cylinders, of which the following is a specification.

My invention relates to certain new and useful improvements in toothed drums or cylinders intended for use, primarily, in machines for separating foreign matter from seed cotton and saving the latter in a condition for commercial use, but to which class of machines, the drum or cylinder is, however, not restricted.

In the accompanying drawings forming part of this specification and in which similar reference characters indicate like parts in the several views.

Figure 1:
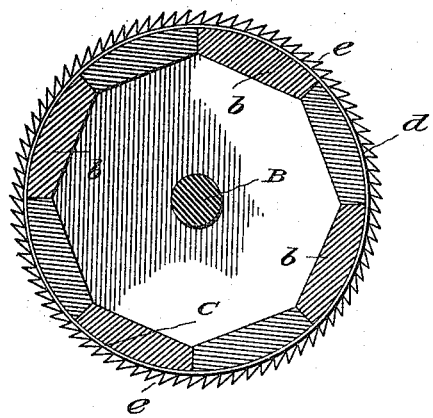
Figure 1 is a vertical sectional view of a toothed drum or cylinder embodying my invention.
Figure 2:
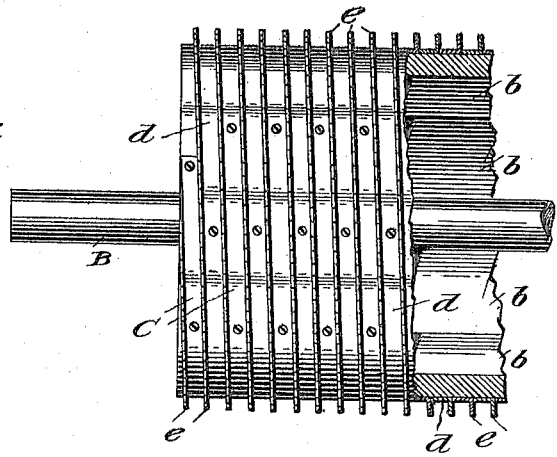
Fig. 2 is an elevation of a portion of the same.
Figure 3:
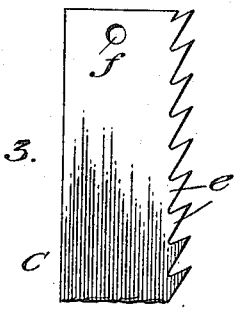
Fig. 3 is a plan view of one of the plates of the drum removed and before bending.
Figure 4:
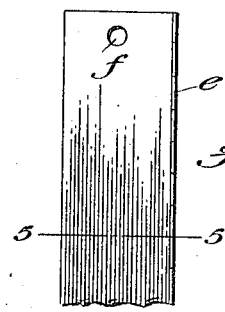
Fig. 4 is a similar view of the plate showing its toothed edge bent at right angles to the body portion.
Figure 5:
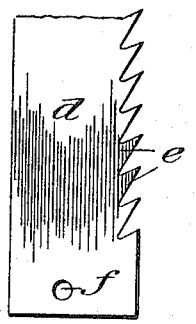
Fig. 5 is a cross section on the line 5—5 of Fig. 4.
Figure 5:
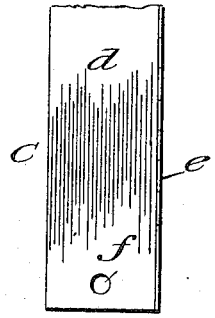

The drum may have any desired dimensions and may be constructed with suitable heads, $a$, and longitudinally extending staves or strips, $b$, said drum being adapted for mounting on a horizontal shaft, B, which extends transversely across the frame of the machine. The periphery of the drum is composed of a series of bands, C, placed side by side in abutting relation, each of said bands consisting of a plate, $d$, having one edge provided with upstanding saw-teeth, $e$, which extend around the drum, the teeth of the series of bands forming transverse rows of saw-teeth, whose extremities point in the direction of the rotation of the drum. The entire surface of the toothed drum is made up of the bands which extend circumferentially of the drum and have their ends provided with holes, $f$, for the reception of screws or other fastening means.

The plates, C, are formed with one plain edge and one serrated or toothed edge and before the said plates are fixed in position on the drum, they are curved into band-form and the serrated edges of the plates are bent at right-angles to the body of the plates so that the teeth project outwardly beyond the circumference of said drum to engage any material in their path of rotation.

It will be observed from the foregoing description that the teeth, which are important components of the drum, are made integral with the bands or plates which form the circumference of the drum, the said teeth being formed directly on one edge of the individual plates or bands and standing outwardly therefrom, thus simplifying the construction and avoiding the use of separate teeth or rows of teeth separately attached around the circumference of the drum or cylinder.

It will be understood that the toothed strip may be cut of any desired length and may be placed on the cylinder spirally or otherwise without departing from the spirit of the invention. By reason of the above construction the outer circumference of the drum or cylinder is composed of the plates or webs $d$, which have substantial width, the edges of the webs of the plates constituting one band abutting against the out-turned portion of the contiguous plate thereby making the webs serve as spacing elements for the outstanding serrated flanges of the bands. With such an arrangement I am also enabled to dispense with the cutting of spiral or other grooves or channels in the drum for the reception of inwardly projecting flanges on the bands, and as the webs extend practically around the bands it will be apparent that I am enabled to secure them at various points by screws or the like, and which serve as a sole fastening means for said bands.

Having thus described my invention what I claim as new and desire to secure by Letters Patent is:—

1. A rotatable drum or cylinder having its exterior composed of bands placed side by side in abutting relation, each of said bands consisting of a strip having one integral edge serrated and turned at substantially right-angles to the body portion whereby the serrations form outstanding teeth, said teeth pointing in the direction of the rotation of said drum or cylinder.

2. A rotatable drum or cylinder having its outer circumference armed with rows of outstanding teeth, said outer circumference of the drum being composed of bands circumscribing the drum and arranged side by side in abutting relation, each of said bands consisting of a plate having one integral edge bent at substantially right-angles so that the teeth extend outwardly from the surface of the drum.

3. A drum or cylinder having its circumference armed with rows of outstanding teeth, said outer circumference of the drum being composed of bands circumscribing the drum and arranged side by side in abutting relation, each of said bands consisting of a plate having one integral edge bent at substantially right-angles so that the teeth extend outwardly from the surface of the drum, and means for securing the bands to said drum the ends of said plates having openings to admit said securing means.

4. As an article of manufacture, a plate having one of its longitudinal edges integrally formed with teeth, said edge being bent adjacent the bases of the teeth at substantially right angles to the plane of the body of the plate, the ends of the plate having openings for securing means.

In testimony whereof I affix my signature.

JAMES H. CARY.

Copies of this patent may be obtained for five cents each, by addressing the "Commissioner of Patents, Washington, D. C."